United States Patent [19]

Mohri et al.

[11] Patent Number: 4,772,813
[45] Date of Patent: Sep. 20, 1988

[54] AMORPHOUS STRIP ELECTRIC PULSE GENERATOR

[75] Inventors: Kaneo Mohri, Fukuoka; Takeshi Nakane, Okazaki, both of Japan

[73] Assignee: Aisin Seiki Kabushikikikaisha, Japan

[21] Appl. No.: 47,567

[22] Filed: Apr. 22, 1987

Related U.S. Application Data

[63] Continuation of Ser. No. 803,529, Dec. 2, 1985, which is a continuation of Ser. No. 452,006, Dec. 21, 1982, abandoned.

[30] Foreign Application Priority Data

Dec. 30, 1981 [JP] Japan ............................. 56-210746

[51] Int. Cl.$^4$ ............................................. H02K 21/22
[52] U.S. Cl. ..................................... 310/26; 324/260; 365/133
[58] Field of Search .................. 365/133, 136; 310/26, 310/152, 154, 156, 168; 324/260

[56] References Cited

U.S. PATENT DOCUMENTS

| | | | |
|---|---|---|---|
| 2,876,419 | 3/1959 | Gianola et al. | 310/26 X |
| 2,977,791 | 4/1961 | Dubsky et al. | 310/26 UX |
| 2,989,872 | 6/1961 | Dvoracek | 310/26 UX |
| 3,011,081 | 11/1961 | Dubsky et al. | 310/26 |
| 3,304,785 | 2/1967 | Börner | 310/26 X |
| 4,065,757 | 12/1977 | Kardashiau | 365/136 X |
| 4,150,314 | 4/1979 | Zabler | 310/155 |
| 4,157,482 | 6/1979 | Kakinuma | 310/155 |
| 4,236,093 | 11/1980 | Birnbaum | 310/155 |
| 4,236,230 | 11/1980 | Thompson | 365/133 |
| 4,309,628 | 1/1982 | Wiegand | 365/133 |
| 4,374,665 | 2/1983 | Koon | 75/123 E |
| 4,591,788 | 5/1986 | Mohri et al. | 324/260 |

FOREIGN PATENT DOCUMENTS 2806249 8/1979 Fed. Rep. of Germany .

OTHER PUBLICATIONS

*Glossary of Physics*, Welch, 1937, p. 142.

Primary Examiner—Patrick R. Salce
Assistant Examiner—D. L. Rebsh
Attorney, Agent, or Firm—Sughrue, Mion, Zinn, Macpeak, and Seas

[57] ABSTRACT

An electric pulse generator utilizing a Matteuci effect. An alternating magnetic field is applied to distorted magnetic substances by a permanent magnet rotor, a polarizedly magnetized running sheet or an electric coil. The amorphous magnetic substances generate sharp pulse voltages between its ends, at the specific phase of the alternating magnetic field.

6 Claims, 10 Drawing Sheets

AMORPHOUS STRIP ELECTRIC PULSE GENERATOR

This is a continuation of Ser. No. 803,529, filed on Dec. 2, 1985 which is a continuation of Ser. No. 452,006 filed Dec. 21, 1982, now abandoned.

BACKGOUND OF THE INVENTION

This invention relates to an electric pulse generator, and more particularly to a magnetic detection type electric pulse generator which generates electric pulses in response to variations of the magnetic field.

Heretofore, there is known such a typical pulse generator of this kind that upon rotation of a permanent magnet voltage is induced on an electric coil wound round a magnetic core. However, since the electric coil and the magnetic core occupy a relatively large portion of a space within the pulse generator, the pulse generator has the fairly large size and heavy weight. Further, this also leads to the high cost. In addition to the above, there are known other electric pulse generators of magnetic detection type which employ a Hall element or a magneto-resistance element. But these generators are subject to strict limitations in environment and temperature for use, and further internal resistance of such generators is so high that a level of noise voltage induced on the element itself or lead wires connected thereto becomes higher accordingly, thus resulting in the reduced S/N ratio.

SUMMARY OF THE INVENTION

A first object of the invention is to provide a pulse generator in which an electric coil for generating electric pulses is dispensed with, a second object is to provide a pulse generator which has a relatively broad allowable range of environment and temperature for use, and a third object is to provide a pulse generator whose noise voltage level is low.

Such a phenomenon that a potential difference is produced across a ferromagnetic substance when twisted in the magnetic field, is known as a Matteuci effect.

Figure 1A:
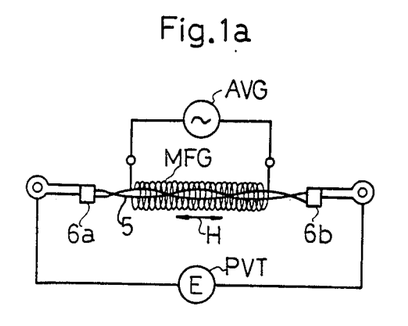
FIG. 1a is a circuit diagram showing a circuitry for measuring a pulse generating from the amorphous magnetic substance.
Figure 1B:
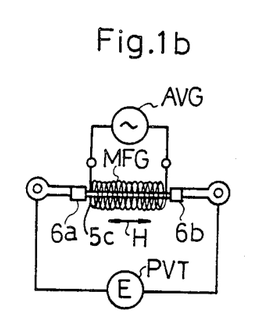
FIG. 1b is a circuit diagram showing a circuitry for measuring a pulse generating from the Wiegand wire.
Figure 1C:
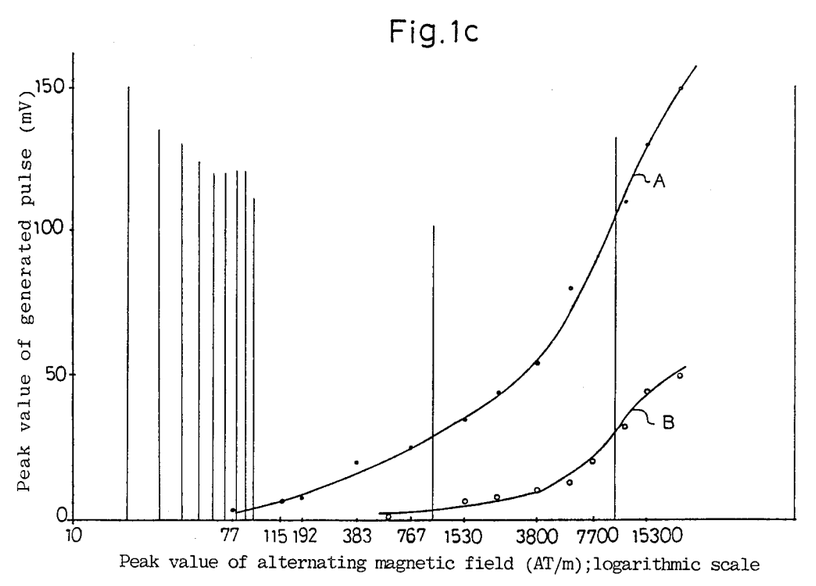
FIG. 1c a graph showing peak values of the pulses generating from the amorphous magnetic substance and the Wiegand wire, in which the axis of abscissas represents peak values of the applied magnetic field with frequency of 1 KHz and the axis of ordinates represents peak values of the generated pulses.

This invention utilizes the Matteuci effect. There can be found no practical example of the Matteuci effect in the past, because the potential difference generated is very small. However, concentrated studies by the inventors have determined that when an alternating magnetic field is applied to ferromagnetic substances of special properties, there can be obtained a voltage pulse whose peak value can be processed by practical electric circuits. FIG. 1c shows peak values of thus obtained voltage pulses. A curve A in FIG. 1c shows data attained such that an alternating magnetic field is applied to an amorphous magnetic substance 5 by an electric coil MFG and then a peak value of the electric pulses generated between both terminals 6a and 6b is observed by a synchroscope PVT, as illustrated in FIG. 1a, while a curve B in FIG. 1c shows data attained such that an alternating magnetic field is applied to a Wiegand wire 5c by the electric coil MFG and then a peak value of the electric pulses generated between both terminals 6a and 6b is observed by the synchroscope PVT, as illustrated in FIG. 1b. The following Tables 1A and 1B show conditions for the measurements of FIGS. 1a and 1b, respectively.

TABLE 1A

| | | |
|---|---|---|
| Amorphous magnetic substance | Composition | $Fe_{79}.Cr_2.B_{17}.Si_2$ (Atom %) |
| | Length | 50 mm |
| | Width | 1 mm |
| | Thickness | 40 μm |
| | Forced twisting | 1 twisting/25 mm |
| | Full length resistance | 2.3 Ω |
| Electric coil MFG | Number of windings | 1150 |
| | Coil length | 30 mm |
| AVG | Voltage adjustable AC power supply, Frequency 1 KHz | |

TABLE 1B

| | | |
|---|---|---|
| Wiegand wire 5c | Composition | $Fe_{48}.Ni_{52}$ (Atom %) |
| | Length | 15 mm |
| | Diameter | 0.25 mm |
| | Processing | Disclosed in the specification of U.S. Pat. No. 3,820,090. Manufacturer: SENSER ENGINEERING CO. |
| | Full length resistance | 0.5 Ω |
| Electric coil MFG | Number of windings | 1150 |
| | Coil length | 30 mm |
| AVG | Voltage adjustable AC power supply, Frequency 1 KHz | |

As to FIG. 1c, it should be noted that the amorphous magnetic substance 5 produces the pulse voltage higher than 10 mV in a range above 200 AT/m (feeding of about 6 mA), while the Wiegand wire 5c produces the pulse voltage higher than 10 mV in a range above 3800 AT/m (feeding of about 114 mA). It should be also noted that both the amorphous magnetic substance 5 and the wiegand wire 5c have their resistance values lower than serveral Ω. Thus reduced resistance leads to a low level noise and high S/N ratio, so that an amplification factor is made large accordingly. Such pulse voltage can be raised through amplification of one or two stages up to a level enough to be processed by a TTL or microprocessor. Moreover, it is also possible to redouble the pulse voltage by arranging a plurality of elements in parallel and connecting them in series.

Figure 1D:
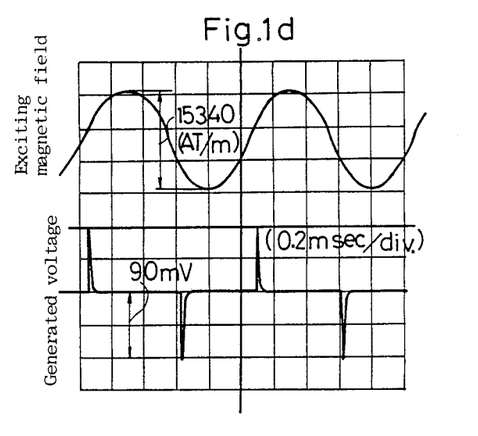
FIG. 1d is a view showing wave forms of the magnetic field applied to the amorphous magnetic substance and the pulses generating therefrom.
Figure 1E:
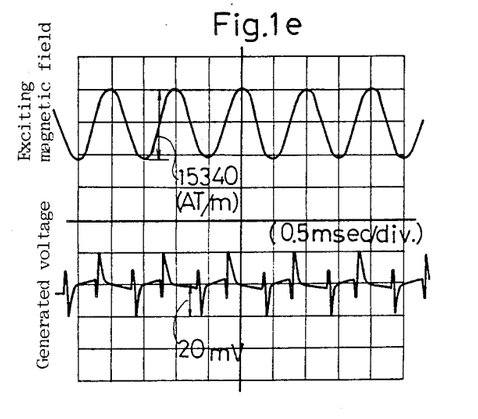
FIG. 1e is a view showing wave forms of the magnetic field applied to the Wiegand wire and the pulses generating therefrom.

FIGS. 1d and 1e show wave forms observed by the synchroscope. Measurement conditions for FIGS. 1d and 1e are given in the following Tables 1D and 1E, respectively.

TABLE 1D

| | |
|---|---|
| Ferromagnetic substance | Amorphous magnetic substance 5 (same as that in Table 1A) |
| Exciting magnetic field | Peak to Peak 15340 AT/m |
| | Peak value 7670 AT/m |
| | Frequency 1 KHz |
| Electric coil | same as that in Table 1A |
| Output voltage | Peak value 90 mV |

TABLE 1E

| | |
|---|---|
| Ferromagnetic substance | Wiegand wire 5 c (same as that in Table 1B) |
| Exciting magnetic field | same as that in Table 1D |
| Electric coil | same as that in Table 1B |
| Output voltage | Peak value 20 mV |

Output from the amorphous magnetic substance 5 can be processed by electric circuits easily after amplification of one or two stages. Output from the Wiegand wire 5c is relatively low, but it can undergo high amplification because its wire resistance is very small, i.e., 0.5 Ω.

Figure 1F:
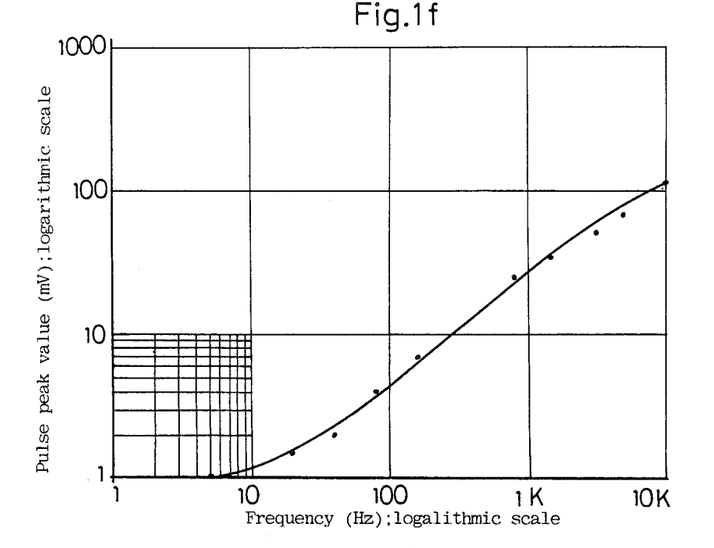
FIG. 1l is a graph showing a frequency-dependent characteristic of peak value of pulses generating from the amorphous magnetic substance.
FIG. 1g is a graph showing a frequency-dependent characteristic of width of pulses generating from the amorphous magnetic substance.

FIG. 1f shows a frequency-dependent characteristic of peak value of voltage pulses output from the amorphous magnetic resistance. Measurement conditions for FIG. 1f are given in the following Table 1f

TABLE 1F

| Ferromagnetic substance | Amorphous magnetic substance | |
| --- | --- | --- |
| | Composition | $Fe_{79}.Cr_2.B_{17}.Si_2$ (Atom %) |
| | Length | 70 mm |
| | *Width | 1 mm |
| | Thickness | 40 μm |
| | Forced twisting | 1 twisting/35 mm |
| Electric coil | same as that in Table 1A | 1530 (AT/m) |
| | Exciting amplitude peak value | |

Data in FIG. 1f shows the fact that as frequency of the magnetic field is increased, a peak value of voltage generated from the amorphous magnetic substance becomes larger.

As mentioned above, since a magnetic flux variation value for the amorphous magnetic substance is constant, the reading (half-wave rectification mean value) of generated pulses by an AC voltmeter is in direct proportion to frequency. The production of half width and peak value of the pulses is always constant.

Figure 1G:
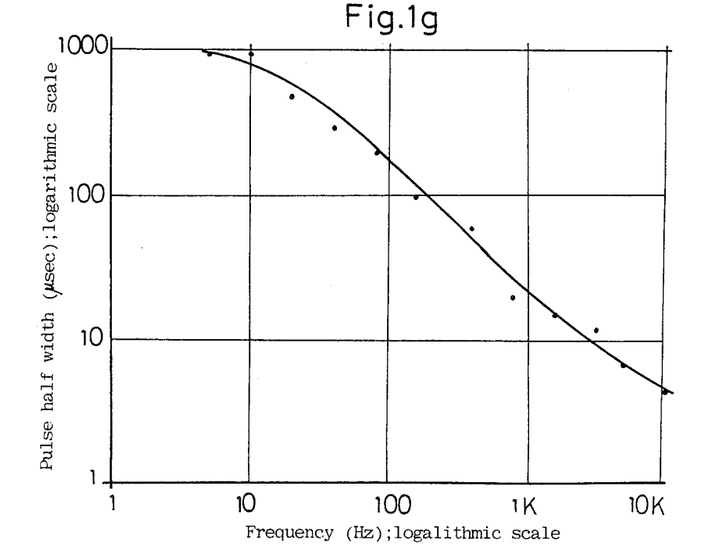

FIG. 1g shows a frequency-dependent characteristic of pulse width of the output voltage from the amorphous magnetic substance. Measurement conditions for this case are the same as those in the foregoing Table 1F. Besides, pulse half width represented by the axis of origin of a graph shown in FIG. 1g means a period of time from the time where the pulse has risen up to a half level of its peak value to that where it will descend to a half level of the peak value. Data in FIG. 1g shows the fact that as frequency of the magnetic field is increased, a pulse width of voltage generated from the amorphous magnetic substance becomes smaller.

As previously noted, the amorphous magnetic substance also has a small resistance value of 2–3 Ω and this leads to a high S/N ratio. Therefore, in addition to such a possibility that a pulse generator comparable to the conventional pulse generator including a voltage inducing coil is attained with no need of such voltage inducing coil, it also becomes possible to attain an amplitude/pulse peak converter based on a relationship between intensity of the alternating magnetic field and peak value of the generated pulse as shown in FIG. 1c, to attain a frequency/pulse peak (f/v) converter based on a relationship between frequency and pulse peak value as shown in FIG. 1f, and further to attain a frequency/pulse width (f/pulse width) based on a relationship between frequency and pulse width as shown in FIG. 1g.

Thus, according to this invention, a pulse generator comprises; a ferromagnetic substance such as the amorphous magnetic substance 5 and Wiegand wire 5c which has both ends connected respectively to electric signal output conductors and to which is imparted a distortion in at least one of the depthwise direction, the widthwise direction and the lengthwise direction; an exciting means for imparting a magnetic field to the ferromagnetic substance; and a magnetic field oscillating means for changing the magnetic field applied to the ferromagnetic substance by the exciting means. In one embodiment of the pulse generator, the exciting means comprises a permanent magnet and the magnetic field oscillating means comprises a mechanical component such as a shaft for driving the permanent magnet. When constituting a pulse generator comparable to a linear encoder, the exciting means comprises a permanent magnet plate or sheet having S poles and N poles alternately formed thereon, and the magnetic field oscillating means comprises a mechanical component for supporting the permanent magnet plate or sheet and causing it to perform a linear motion. When the pulse generator is used as a means to read magnetic information, the exciting means comprises a magnetic information recording medium such as a magnetic tape, disc or drum into which are written the information, and the magnetic field oscillating means comprises a mechanical component such as a reel shaft, support disc or drum shaft for driving the medium. In another embodiment where the pulse generator is used as an electric converter or an insulative coupler, the exciting means comprises an electric coil and the magnetic field oscillating means comprises an electric circuit or a solid semiconductor device adapted to apply an electric signal (voltage) including information to the electric coil.

BRIEF DESCRIPTION OF THE DRAWINGS

FIG. 2b is a side view of a rotor 1 and a amorphous magnetic substance 5 shown in FIG. 2a;

FIG. 7b is a sectional view taken along the line VIIB—VIIB in FIG. 7a;

DESCRIPTION OF EMBODIMENTS

Figure 2A:
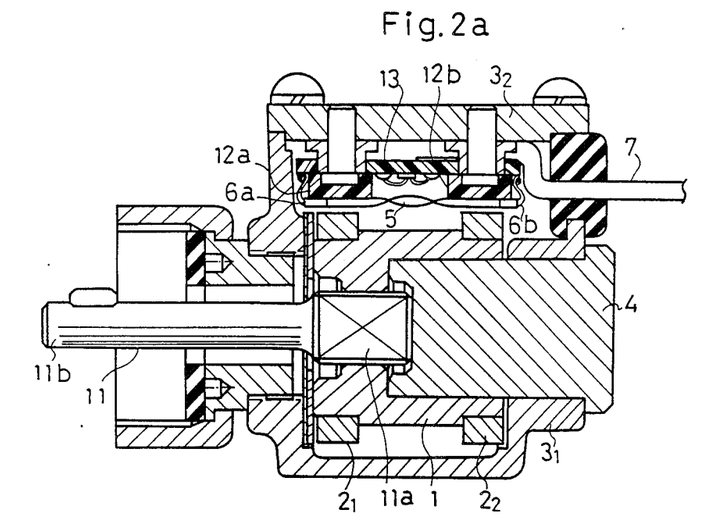
FIG. 2a is a longitudinal sectional view showing one embodiment of the invention.
Figure 2B:
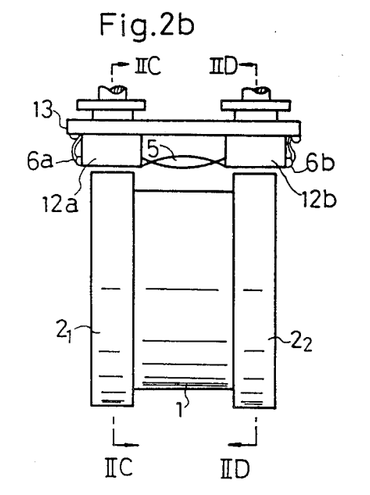
Figure 2C:
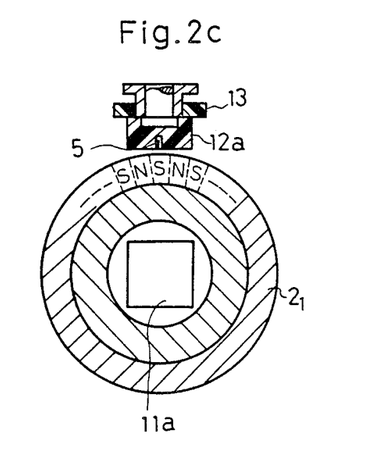
FIGS. 2c and 2d are sectional views taken along the lines IIC—IIC and IID—IID in FIG. 2b, respectively.
Figure 2D:
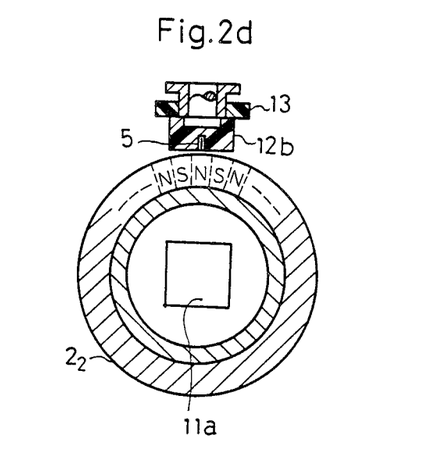

FIGS. 2a to 2d show one embodiment of the invention. More specifically, FIG. 2a shows a longitudinal sectional view, FIG. 2b is a front view selectively showing a rotor 1 including permanent magnets, an amorphous magnetic substance 5 and support members 12a, 12b and FIGS. 2c and 2d are sectional views taken along the lines IIC—IIC and IID—IID in FIG. 1b, respectively. Referring to these drawings, ring-like permanent magnets $2_1$ and $2_2$, each provided with a train of magnetic poles, are secured to both ends of the rotor 1. As shown in FIGS. 2c and 2d, each of the permanent magnet $2_1$ and $2_2$ includes 40 magnetic poles (i.e., 20 N poles and 20 S poles) in the form of N-S-N-S . . . extending in the circumferential direction, and they are so disposed that the N poles on the permanent magnet face the S poles on the other permanent magnet in the axial direction of the rotor 1. The permanent magnets $2_1$ and $2_2$ are ferrite magnets, while the rotor 1 is a magnetic substance. The rotor 1 is rotatably supported by a bearing member 4 press-fitted in a casing $3_1$. Shaft 11 a rotating force to the rotor 1 from the exterior, the shaft 11 having one end 11a which is shaped into a rectangular form in section and fitted into an opening in the rotor 1. The other end 11a of the shaft 11 has a shape capable of being coupled to an output shaft of a transmission, because the pulse (or rotation signal) generator of this embodiment is to be used as a vehicle speed sensor.

In the proximity of the outer periphery of the rotor 1 is disposed an amorphous magnetic substance 5 in the form of a thin plate which extends in the axial direction of the rotor 1 and has both ends facing the respective permanent magnets $2_1$ and $2_2$, the substance 5 including terminals 6a, 6b previously press-bonded thereto and being shaped forcedly into a rectilinear form after twisting two times. The amorphous magnetic substance 5 is mounted to support members 12a, 12b of non-magnetic substance, which are in turn secured to a casing $3_2$. In the state as shown in FIG. 2b, one end of the amorphous magnetic substance 5 faces one N pole of the permanent magnet $2_2$ and the other end thereof faces one S pole of the permanent magnet $2_1$, but when one end is made to face the S pole of the permanent magnet $2_2$ after some rotation of the rotor 1, the other end then faces the N pole of the permanent magnet $2_1$. The output terminals 6a, 6b are drawn out of the casings $3_1$, $3_2$ through a lead 7.

In this embodiment, when the rotor 1 is turned, an alternating magnetic field is applied to the amorphous magnetic substance 5 in the lengthwise direction thereof along with rotation of the permanent magnets $2_1$, $2_2$, so that produces voltage pulses as shown in FIG. 1d between both the terminals 6a and 6b.

Further in the foregoing embodiment, the amorphous magnetic substance 5 is supported by the support members 12a and 12b in the state such that forced twisting has been imparted to the substance 5. Several other examples of the method for supporting the amorphous magnetic substance will be described hereinafter.

Figure 3A:
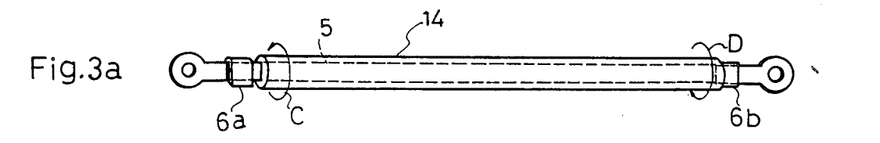
FIGS. 3a and 3b are enlarged perspective views showing one exemplified method for supporting the amorphous magnetic substance 5.
Figure 3B:
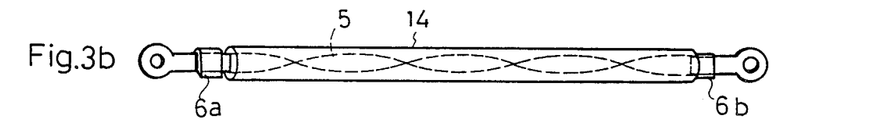

FIGS. 3a and 3b are perspective views showing another examplified supporting method. Amorphous magnetic substances ($Fe_{79}$ $Cr_2$ $B_{17}$ $Si_2$) has dimensions as follows; width 1.0 mm, thickness 40 μm and length 5 cm. The reference numeral 14 designates a support means 14 serving as a casing, being formed of resin which can be softened by heating. In the interior of the casing 14 is formed a space (or gap) fitting the dimensions of the amorphous magnetic substance 5, through which space is inserted the amorphous magnetic substance 5. Since the casing 14 is softened by heating, both the casing 14 and the amorphous magnetic substance 5 are twisted by applying a force to both ends of the casing 14, with the amorphous magnetic substance 5 being inserted therethrough in the opposite directions (the direction indicated by an arrow C or D) while heating. Then after imparting a predetermined times of twistings, the casing 14 is hardened by heating so that the amorphous magnetic substance 5 is held in the twisted state.

Figure 4:
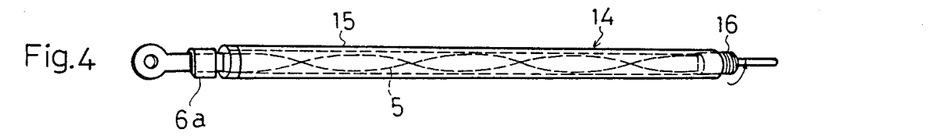
FIGS. 4 and 5 are enlarged perspective views showing other exemplified methods for supporting the amorphous magnetic substance 5, respectively.

FIG. 4 is a perspective view showing still another exemplified supporting method. In this example, a casing 15 is formed into a hollow member. The casing 15 comprises a cylindrical member and a male screw 16 which engages with a female screw (not shown) formed at one end of the cylindrical member. To the male screw 16 and the other end of the cylindrical member are secured both ends of the amorphous magnetic substance 5 being inserted through the casing 3. Therefore, by turning the male screw 16 the amorphous magnetic substance 5 is twisted accordingly and hence held in the twisted state after any desired number of twistings. Besides, the casing 15 is formed of such a material as is non-magnetic and has large electric resistance (no conductivity).

Figure 5:
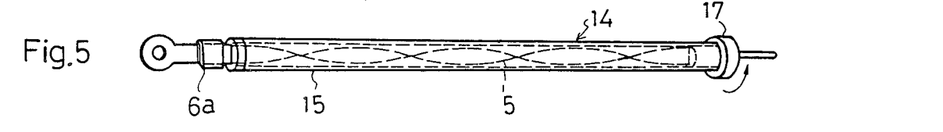

FIG. 5 is a perspective view showing still another exemplified supporting method. In this example, the male screw 16 shown in FIG. 4 is replaced of a cap 17. Thus, the amorphous magnetic substance 5 can be held in the desired twisted state by twisting the amorphous magnetic substance 5 at the predetermined times through rotation of the cap 17 and then bonding the cap 17 to the cylindrical member 15 with adhesives or other means.

According to still another exemplified supporting method not shown, the amorphous magnetic substance 5 is twisted the predetermined number of times by any desired means and then it undergoes resin seal by an injection molding machine while being held in the twisted state.

Figure 6A:
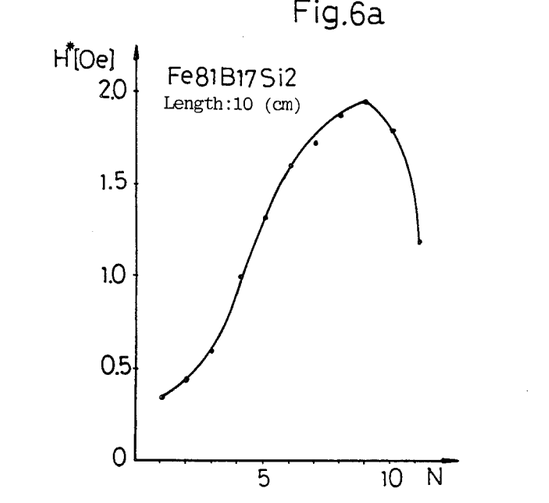
Figs. 6a and 6b are graphs showing magnetic characteristics of the amorphous magnetic substance, respectively showing a relationship between the number of twistings N and the magnetic field intensity H* and that between the ambient temperature T and the magnetic field intensity H*.
Figure 6B:
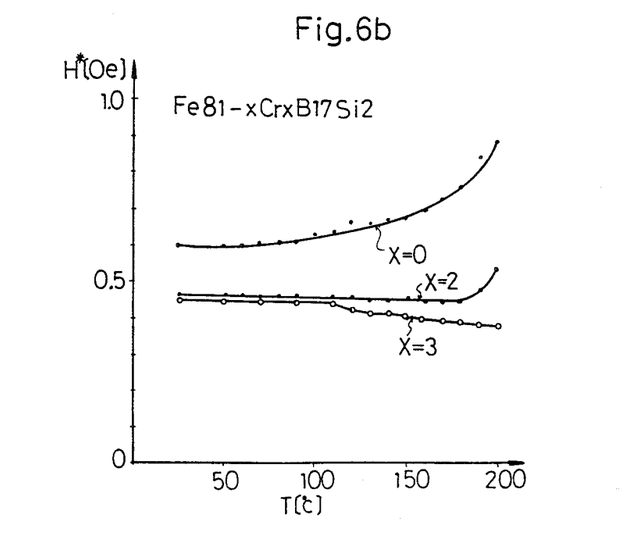

The result of measuring characteristics of the Matteuci effect element thus constructed will be described hereinafter. FIG. 6a shows a graph resulting from the magnetic field H*(0e) (oersted) at the critical point, that is, the minimum intensity of magnetic field detectable, based on the Matteuci effect of the amorphous magnetic substance, is measured while varying the number of twistings N. Referring to this graph, it is seen that the value of H* is very small, i.e., about 0.3~2.0 [0e]. Making a comparison, the conventional Wiegand wire has about 30[0e] of H*. In this connection, an amorphous magnetic substance used in the measurement of FIG. 6a has composition of $Fe_{81} B_{17} Si_2$. FIG. 6b is a graph resulting from measuring a relationship between the magnetic field H* and the ambient temperature T (°C.) as to amorphous magnetic substances whose compositions are $F_{81} B_{17} Si_2$, $Fe_{79} Cr_2 B_{17} Si_2$ and $Fe_{78} Cr_3 B_{17} Si_2$, respectively. In this experiment, the number of twistings N per length of 10 cm is 3, and each measurement has been performed at the time when 10 minutes has lapsed after changing the temperature. According to FIG. 6b it is seen that the amorphous magnetic substance with X=2, that is, composition of $Fe_{79} Cr_2 B_{17} Si_2$, has a relatively stable characteristic against changes in the temperature over a wider range. It has been also confirmed as a result of the measurement that when the magnetic field (0.001 [Hz] to 6 (KHz]) more than 1.2 [0e] is applied, the output voltage has a pulse width of 20 to 50 [μS] and shows a very sharp characteristic.

Figure 7A:
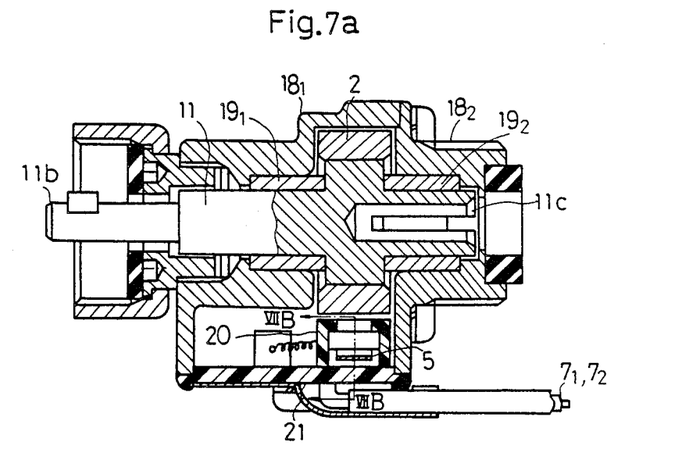
Fig 7a is a longitudinal sectional view showing another embodiment of the invention.
Figure 7B:
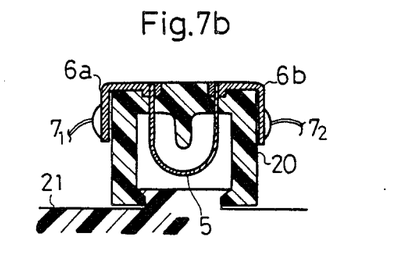
Figure 7C:
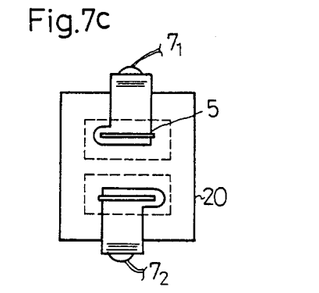
FIG. 7c is a plan view of a force frame 20.

FIG. 7a shows another embodiment of the invention. Referring to FIG. 7a, a single ring-like permanent magnet 2 is secured to the rotor 1. The outer peripheral surface of the permanent magnet 2 is polarized and magnetized into 12 poles (i.e., 6 S poles and 6 N poles) in the form of N-S-N-S-. . . extending in the circumferential direction. The rotor 1 is rotatably supported by bearings $19_1$ and $19_2$ which are respectively press-fitted in casings $18_1$ and $18_2$. Since the pulse generator of this embodiment is used as a vehicle speed sensor, one end 11b of the rotor 1 has a shape adaptable to be coupled with an output shaft of a transmission, while the other end 11c thereof has a shape adaptable to be coupled with a speed meter cable. In the proximity of outer peripheral surface of the permanent magnet 2 is disposed the amorphous magnetic substance 5 forcedly shaped into a U-shape. FIG. 7b shows a longitudinal sectional view of the amorphous magnetic substance 5 (taken along the line VIIB—IVVB in FIG. 7a), and FIG. 7c shows a plan view of leading end portions of the amorphous magnetic substance 5. The amorphous magnetic substance 5 has both end portions inserted through two slits in a force frame 20, and it is forcedly bent into a U-shape. The force frame 20 is secured to a support 21. A spacing between the two slits is set equal to that between each two adjacent N or S poles in the circumferential direction of the permanent magnet 2. By so doing, intensity of the magnetic field applied to the leading ends of the amorphous magnetic substance is made higher, and this leads to large variations of the magnetic field induced along with rotation of the rotor 1.

Figure 7D:
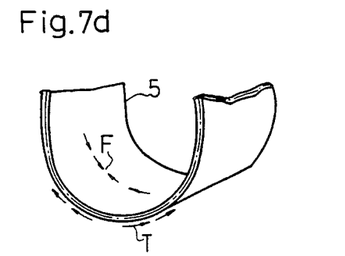
FIG. 7d is a partially enlarged perspective view of the amorphous magnetic substance 5.
Figure 7E:
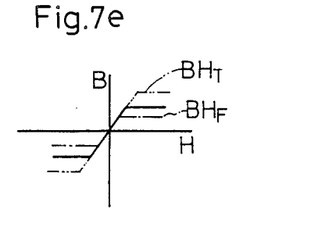
FIG. 7e is a graph showing a magnetization characteristic of the amorphous magnetic substance 5.

As shown in FIG. 7d, the amorphous magnetic substance 5 undergoes a compressive force F acting on its surface at the retracted side (i.e., inner surface) and a tensile force T acting on its surface at the extended side (i.e., outer surface) at all times due to the forced bending into a U-shape. Consequently, the amorphous magnetic substance 5 shows such a magnetic characteristic on the retracted side receiving the compressive force F that coercive force is small at a small amount of the saturated magnetic flux density, as indicated by an alternate long and short dash line $BH_F$, while it shows such a magnetic characteristic on the extended side receiving the tensile force T that coercive force is large at a large amount of the saturated magnetic flux density, as indicated by an alternate long and two short dashes line $BH_T$. A solid line indicates a magnetic characteristic at the boundary surface on which neither tensile force nor compressive force acts.

Figure 8A:
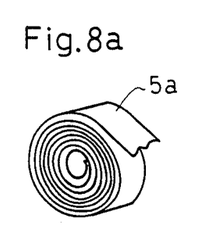
FIG. 8a is a perspective view showing a shape of the amorphous magnetic substance 5a at one step of its manufacturing processes.
Figure 8B:
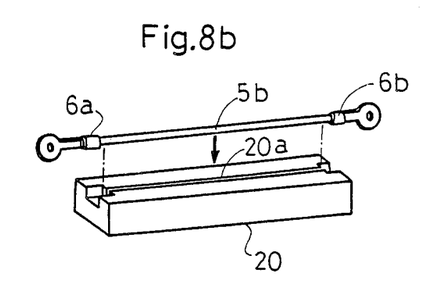
FIG. 8b is a perspective view showing one mounting process of the amorphous magnetic substance 5b which is held in a bent shape in the normal state.

In addition to the foregoing two embodiments wherein a distorsion is imparted to the amorphous magnetic substance through bending thereof, the similar distortion can be also attained in such a manner that the amorphous magnetic substance is made to have a bent shape in the original form and then extended into a rectilinear shape. One example of this method will be now described. As shown in FIG. 8a, an amorphous thin plate 5a is forcedly shaped into a spiral form and then held at the temperature of about 380° C. for an hour, so that it is made to have a spiral form in the normal state. Thereafter, the terminals 6a and 6b are press-bonded to both ends of the plate and, as shown in FIG. 8b, an amorphous magnetic substance 5b is inserted into a slit 20a formed in the force frame 20, with the terminals 6a and 6b being secured to the force frame 20 using adhesives, whereby the amorphous magnetic substance is now held in a rectilinear shape. As an alternative, the amorphous magnetic substance may be first extended and then secured in that state to the terminals 6a, 6b which have been fixed to the force frame 20 in advance. In this case, the slit 20a can be dispensed with.

Figure 9:
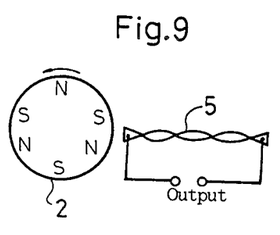
FIGS. 9, 10, 11, 12, 13 and 14 are schematic views of principal parts showing other embodiments of the invention, respectively.
Figure 10:
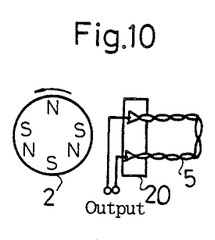
Figure 11:
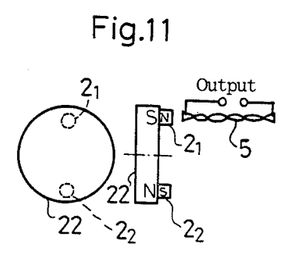

In any of the embodiments as mentioned above, both ends of the amorphous magnetic substance face the S and N poles of the permanent magnet at the same time, it is also possible to make only one end of the amorphous magnetic substance 5 face the permanent magnet 2, as shown in FIG. 9. Moreover, the twisted amorphous magnetic substance 5 may be bent into a U-shape so that both ends are made to have a spacing therebetween equal to a pitch of magnetic poles formed in the permanent magnet 2, and then disposed with such both ends facing the permanent magnet 2, as shown in FIG. 10. It is further possible that the twisted amorphous magnetic substance is bent in an arcuate shape so that both ends face each other with the permanent magnet 2 between. When constituting a detection part of a tachometer, as shown in FIG. 11 for example, the permanent magnets $2_1$ and $2_2$ are secured to a rotatable member 22 and one end of the amorphous magnetic substance 5 faces a rotating path of the permanent magnets $2_1$, $2_2$. As an alternative, the amorphous magnetic substance 5 is bent into an arcuate shape and both ends thereof face the rotating path of the permanent magnets $2_1$, $2_2$ in such a manner that when one end faces the S pole, the other end is made to face the N pole, while when one end faces the N pole, the other end is made to face the S pole. With this arrangement, the magnetic field applied to the amorphous magnetic substance is increased in its strength, thus resulting in a higher pulse peak value.

Figure 12:
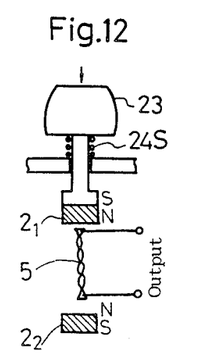

In the embodiment as shown in FIG. 12, the permanent magnet $2_1$ is secured to a reciprocating control knob 23 and the amorphous magnetic substanct 5 is fixed between the movable permanent magnet $2_1$ and the stationary permanent magnet $2_2$. Designated at the numeral 24S is a coil spring. As the knob 23 is pressed down, the upper end of the amorphous magnetic substance 5 turns to an N pole and the lower end thereof turns to a P pole. Then, at the time when the knob 23 descends to a certain degree, the amorphous magnetic substance 5 generates a positive polar pulse. As the knob 23 is released from the pressed-down state, the upper end of the amorphous magnetic substance 5 turns to a S pole and the lower end thereof turns to an N pole. Then, at the time when the knob 23 ascends to a certain degree, the amorphous magnetic substance 5 generates a negative polar pulse. This embodiment can be used as an input key. An amplification processing circuit is connected to the amorphous magnetic substance 5 and the generated pulses are counted by a counter can provide a manual control times counter, while a reciprocating automatic counter can be attained by coupling the knob 23 to a reciprocating mechanical system. On this occasion, if the permanent magnets $2_1$ and $2_2$ are connected to each other, a variation width of the magnetic field is increased. As an alternative, the amorphous magnetic substance 5 can be made movable with the permanent magnets $2_1$, $2_2$ being fixed.

Figure 13:
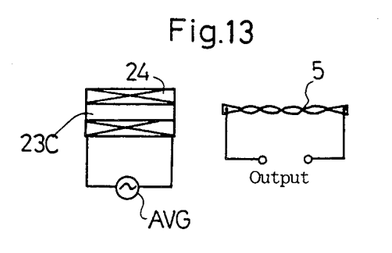

FIG. 13 shows still another embodiment wherein the pulse generator is applied to a range meter. In this embodiment, AC voltage of constant-frequency and constant-voltage is applied from an AC poer supply AVC to an electric coil 24 wound round a magnetic core 23C, so that the amorphous magnetic substance 5 generates pulse voltage having a peak value and a pulse width in accordance with distance between the core 23C and the amorphous magnetic resistance 5. Thus, the range meter can be attained by bonding or coupling the electric coil 24 or the amorphous magnetic substance 5 to the objective to be measured and then connecting a pulse peak or pulse width analyzer to the amorphous magnetic substance 5.

Figure 14:
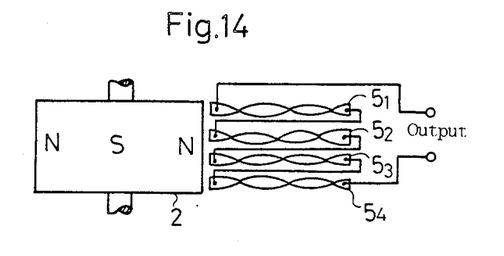
Figure 15A:
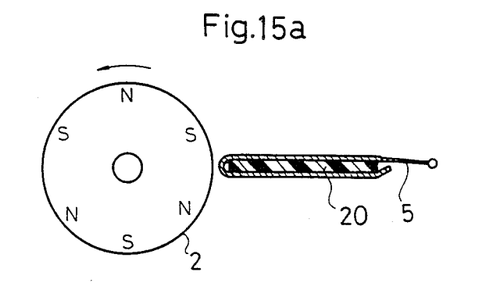
Figs. 15a and 15b are a side and plan view showing another exemplified mount state of the amorphous magnetic substance 5, respectively.
Figure 15B:
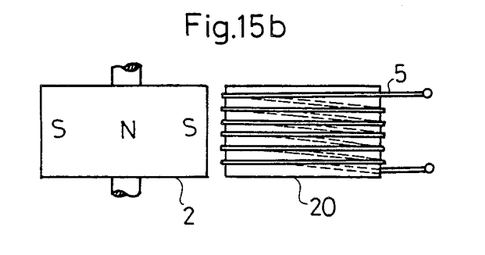

As previously noted, a peak value of the pulse voltage can be increased by such an arrangement that a plurality of amorphous magnetic substances or Wiegard wires are disposed in parallel and then connected in series. As shown in FIG. 14, for example, the amorphous magnetic substances $5_1$ to $5_4$ are disposed in parallel with respect to the permanent magnet 2 and then connected in series, whereby peak voltage of the generated pulse is increased nearly four times in comparison with a case using the amorphous magnetic substance $5_1$ only. Serial electric connection with lead wires can be dispensed with in another embodiment. As shown in FIG. 15a (side view) and FIG. 15b (plan view), for example, the amorphous wire 5 is wound round the support frame 20 such that it is twisted right on the front side of the support frame 20 and left on the rear side thereof. With this arrangement, voltage generated at the respective parts of the wire on the front and rear sides of the support wire 20 is made to have the same direction in its polality over the length of the wire 5, so that there occurs pulse voltage with a high peak value between the output terminals. As a modification of this embodiment, such an arrangement is also possible that a plurality of pins are planted on the support frame 20 at one end thereof on the permanent magnet side and the other opposed end, and then wire 5 is laid over the pins in a zig-zag form only on the front side of the support frame 20.

Figure 16A:
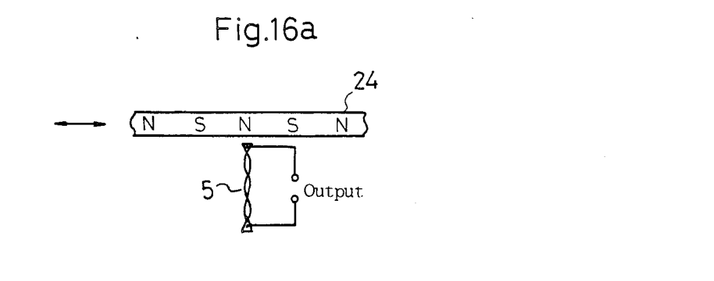
FIG. 16a is a plan view of a principal part showing still another embodiment of the invention.

In the embodiment as shown in FIG. 16a, the amorphous magnetic substance 5 is disposed to face a plate-like permanent magnet 24. On the permanent magnet 24 are alternately formed a plurality of S poles and N poles at a uniform pitch in the lengthwise direction. The plate-like permanent magnet 24 is secured or coupled to a reciprocating mechanical component. Frequency (or periode) of pulses generated by the amorphous magnetic substance 5 corresponds to a moving speed of the permanent magnet 24, and a peak value and pulse width of the generated pulses also correspond to a moving speed of the permanent magnet 24. In this connection, if a pitch of magnetic poles formed on the permanent magnet 24 is changed to have a predetermined pattern in the lengthwise direction, there can be obtained pulses having frequency distribution in accordance with a movement amount of the permanent magnet 24. To the contrary, the permanent magnet 24 may be fixed with the amorphous magnetic substance 5 being made movable. Moreover, in case the magnetic poles are formed at a uniform pitch, it is desirable that the amorphous magnetic substance 5 is bent into a U-shape and both ends are set to have a distance therebetween equal to the pitch of the magnetic poles. The permanent magnet 24 may be replaced of a magnetic sheet.

Figure 16B:
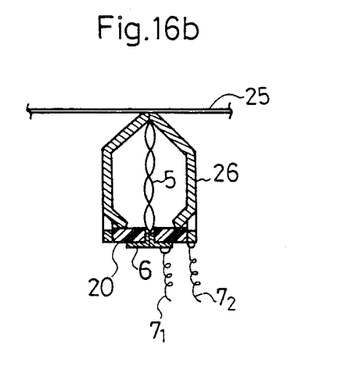
FIG. 16b is a longitudinal sectional view showing still another embodiment of the invention.
Figure 16C:
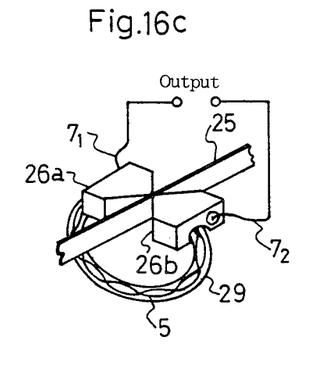
FIG. 16c is a perspective view showing the embodiment of FIG. 16b.

FIG. 16b shows still another embodiment including a magnetic head. In this embodiment, the amorphous magnetic substance 5 has one end which is disposed between both leading ends of a metal head case 26 and the other end which is supported by the terminal 6. The magnetic tape 25 is wound round reels and driven by a capstan, as well known in the art. In the embodiment as shown in FIG. 16c, both ends of the amorphous magnetic substance 5 bent into a ring-like shape are secured to metal head cases 26a and 26b, respectively, and the amorphous magnetic substance 5 is covered with a flexible vinyl tube 29. The magnetic tape 25 passes between both ends of the amorphous magnetic substance 5 facing each other. As an alternative, the amorphous magnetic substance 5 may divided into a pair of halves which are coupled through a magnetic substance magnetically and electrically.

Figure 17:
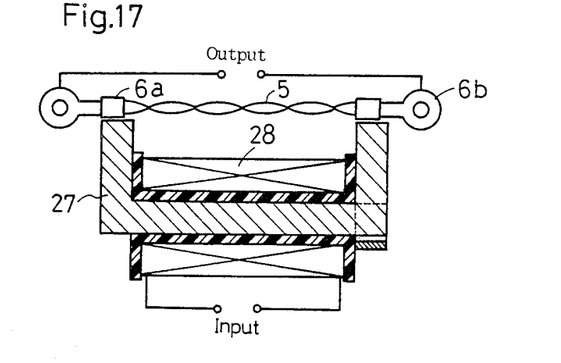
FIG. 17 is a longitudinal sectional view showing still another embodiment of the invention.

FIG. 17 shows still another embodiment used as a converter, wherein the exciting means comprises an electric coil wound round a magnetic core 27. The magnetic field oscillating means comprises an electric energization circuit connected to the electric coil 28. This embodiment is applicable to various devices such as a current transformer for detecting currents based on pulse peaks, a f/v (frequency/pulse peak) converter, a f/pw (frequency/pulse width) converter, a sine wave/pulse converter, a voltage/pulse peak converter, and a voltage/pulse width converter. Furthermore, similarly to the embodiment as shown in FIG. 13, a detection part for a range meter, a position finder or the like can be attained through such a modification that either one of the amorphous magnetic substance 5 and the electric coil 28 is made movable in the direction orthogonal to the lengthwise axis of the amorphous magnetic substance 5.

An amorphous magnetic substance has such a magnetic property that it is ferromagnetic and has high permeability and high intensity of saturated magnetization with a small coercive force, and has such a mechanical property that it has very high in breaking strength and superior in elasticity and stability. In particular, since pulses generated by the amorphous magnetic substance have a relatively high peak value under the distorted state and it is hard to pick up noises because of the low internal resistance (i.e., several ohms), such a substance is suitable for use in various types of pulse generators as mentioned above. It should be noted that an amorphous magnetic substance is always obtained in the form of a thin plate, because it must be manufactured by cooling liquid phase metals. Such an intrinsic form of the amorphous magnetic substance is advantageous in reading high density recorded information, when used as a magnetic reading head as shown in FIGS. 16a, 16b and 16c. In the embodiments using the permanent magnet rotor, the number of generated pulses for each rotation thereof depends on polalization density of the permanent magnet.

According to this invention, as will be clear from the description above, in the pulse generator wherein pulses are generated in conjunction with a mechanical movement, the electric coil for generating pulses is not required and the amorphous magnetic substance serving as a generating member has enough ruggedness that the pulse gererator is superior in both environment and vibration resistances. Further, when applied to sensors for the light electrical art and to converters or magnetic reading heads for the heavy electrical art, there can be many advantages, such as input and output insulation can be effected easily, noises are hard to pick up and reading resolution is increased. In addition to the above, the manufacturing cost can be made lower.

Having now fully set forth both structure and operation of preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that with the scope of the appended claims, the invention may be practiced otherwise than as specifically set forth herein.

What we claim is:

1. An electric pulse generator comprising:
    a thin plate of amorphous magnetic material in the form of an elongated strip which is twisted along the length thereof and which has both ends connected respectively to terminals of an electric signal output circuit;
    support means engaging both ends of said strip for maintaining said strip in constant twisted condition;
    magnetic exciting means for imparting a magnetic field to said amorphous magnetic material; and
    a magnetic field oscillating means for changing the magnetic field applied to said amorphous magnetic material by said magnetic exciting means;
    wherein said magnetic field oscillating means comprises a mechanical member which is operatively coupled to said magnetic exciting means for movement relative to said amorphous magnetic material by virtue of an external force.

2. An electric pulse generator as set forth in claim 1, wherein said magnetic exciting means comprises at least one permanent magnet.

3. An electric pulse generator according to claim 2, wherein said exciting means comprises a plurality of permanent magnets operatively coupled to said mechanical member to present alternating North and South poles whereby upon movement of said magnets relative to said strip of amorphous magnetic material an alternating magnetic field is applied to the amorphous magnetic material.

4. An electric pulse generator comprising:
    a thin plate of amorphous magnetic material in the form of an elongated strip which is twisted along the length thereof and which has both ends connected respectively to terminals of an electric signal output circuit;
    support means engaging both ends of said strip for maintaining said strip in constant twisted condition;
    an exciting means for imparting a magnetic field to said amorphous magnetic material; and
    a magnetic field oscillating means for changing the magnetic field applied to said amorphous magnetic material by said exciting means;
    wherein said exciting means is comprised of an electric coil and said magnetic field oscillating means comprises means for applying an alternating voltage of said electric coil.

5. An electric pulse generator according to claim 4, wherein said means for applying an alternating voltage to said electric coil comprises an electric circuit.

6. An electric pulse generator according to claim 4, wherein said means for applying alternating voltage to said electric coil comprises a solid semiconductor device.

* * * * *